(12) United States Patent
Masip Garcia

(10) Patent No.: US 10,295,327 B2
(45) Date of Patent: May 21, 2019

(54) METHOD AND DEVICE FOR MEASURING OPENINGS IN AEROSOL CONTAINERS

(71) Applicant: JM Filling Solutions, S.L., Paterna, Valencia (ES)

(72) Inventor: Jorge Masip Garcia, Valencia (ES)

(73) Assignee: JM Filling Solutions, S.L., Paterna, Valencia (ES)

( * ) Notice: Subject to any disclaimer, the term of this patent is extended or adjusted under 35 U.S.C. 154(b) by 0 days.

(21) Appl. No.: 15/322,056

(22) PCT Filed: Jun. 27, 2014

(86) PCT No.: PCT/ES2014/070531
§ 371 (c)(1),
(2) Date: Dec. 23, 2016

(87) PCT Pub. No.: WO2015/197883
PCT Pub. Date: Dec. 30, 2015

(65) Prior Publication Data
US 2017/0146331 A1     May 25, 2017

(51) Int. Cl.
| | | |
|---|---|---|
| *B07C 5/34* | (2006.01) |
| *G01B 5/10* | (2006.01) |
| *B07C 5/12* | (2006.01) |
| *G01B 21/14* | (2006.01) |
| *G01B 5/12* | (2006.01) |
| *G01B 5/30* | (2006.01) |

(52) U.S. Cl.
CPC .................. *G01B 5/10* (2013.01); *B07C 5/12* (2013.01); *B07C 5/3404* (2013.01); *G01B 5/12* (2013.01); *G01B 5/30* (2013.01); *G01B 21/14* (2013.01)

(58) Field of Classification Search
CPC ... B07C 5/3404; B07C 5/3408; G01B 5/0037; G01B 5/012; G01B 5/08; G01B 5/12; G01B 21/10; G01B 21/14
See application file for complete search history.

(56) References Cited

U.S. PATENT DOCUMENTS

| | | |
|---|---|---|
| 2,596,342 A | 5/1952 | McNutt et al. |
| 3,355,811 A | 12/1967 | Tailleur |
| (Continued) | | |

FOREIGN PATENT DOCUMENTS

| | | |
|---|---|---|
| CN | 103245274 A | 8/2013 |
| CN | 203241000 U | 10/2013 |
| (Continued) | | |

*Primary Examiner* — Joseph C Rodriguez
(74) *Attorney, Agent, or Firm* — Richard M. Goldberg

(57) ABSTRACT

A method includes the following steps: aligning a measuring head with an aerosol container, without relative speed between the two, lowering and centring the head; lowering a measuring device and taking the corresponding measurement at different points of the perimeter of the opening; rotating the measuring device in relation to the container; removing the head, transmitting the data, and removing the unsuitable containers, and a device for performing the method includes a head support having an axial movement device, a centring element; a support for the measuring device, an assembly of measuring arms provided with probes, an arrangement for returning to a rest position, at least one measurement reader, and a rotating device for rotating the measuring device or head.

8 Claims, 4 Drawing Sheets

(56) References Cited

U.S. PATENT DOCUMENTS

| | | | | |
|---|---|---|---|---|
| 3,739,951 A | * | 6/1973 | Geller | A61M 15/0065 |
| | | | | 222/630 |
| 3,914,872 A | * | 10/1975 | Strzala | G01B 3/50 |
| | | | | 209/531 |
| 4,307,514 A | * | 12/1981 | Ange | G01B 21/14 |
| | | | | 33/543.1 |
| 4,888,877 A | * | 12/1989 | Enderle | G01B 5/012 |
| | | | | 33/503 |
| 5,761,820 A | * | 6/1998 | Emery | G01B 5/08 |
| | | | | 209/532 |
| 6,006,437 A | * | 12/1999 | Cipriani | G01B 13/16 |
| | | | | 33/543.1 |
| 6,871,415 B2 | * | 3/2005 | Wendt | G01B 3/46 |
| | | | | 33/522 |
| 9,046,336 B2 | * | 6/2015 | Garin | G01B 5/08 |
| 2008/0066332 A1 | | 3/2008 | Metcalf et al. | |
| 2013/0247404 A1 | | 9/2013 | Garin et al. | |

FOREIGN PATENT DOCUMENTS

| | | |
|---|---|---|
| DE | 1773214 U | 8/1958 |
| DE | 8318423 U1 | 10/1983 |
| GB | 1202621 A | 8/1970 |
| JP | 2001241904 A | 9/2001 |

\* cited by examiner

METHOD AND DEVICE FOR MEASURING OPENINGS IN AEROSOL CONTAINERS

BACKGROUND OF THE INVENTION

This invention refers to a method for automatically measuring the opening of an aerosol container in a continuous process, in which a piece known as a cup is inserted, which holds the dispensing valve, and with interior or exterior plastic deformation by mechanical means taking place so that said plastic deformation causes a sealed closure withstanding the pressure contained inside the container after this has been filled with the relevant product. This invention also extends to a device which puts this method into practice.

STATE OF THE ART

Aerosol containers are formed in a cylinder or body normally made up of metal plate, which is closed by means of a weld and/or plastic deformation of the joining edge. A lower cover or base and an upper cover or dome are joined to these cylinders (upper and lower refer to the container placed vertically, "standing up"), also joined to the canister, normally by means of a weld and/or plastic deformation. The dome is provided with a central hole, in which the cup is fitted with the valve, which comes pre-assembled, in later processes. This cup has an exterior diameter substantially identical to the diameter of the central hole of the dome, so that one is inserted over the other. The cup thus has a cylindrical portion with an interior surface and an exterior surface. Said cylindrical portion has an upper edge resting on the corresponding upper edge of the hole of the dome. The cylindrical portion extends further down (this is longer) than the wall of the hole of the dome.

For the hermetic sealing to properly withstand the pressure to which the container is subjected a plastic deformation of the cylindrical part takes place in the area below the wall of the hole in the dome at a certain height and with a certain degree of deformation. The seam formed by this deformation tends to be discontinuous, but the invention is also similarly applicable in the event of the seam being continuous. If the deformation is less than it should be, the container could leak and suddenly expel the valve holder cup, with the dangerous and toxic situation that could be entailed. Apart from this, if the deformation is greater than it should be, there could be excessive deformation of the join, giving rise to leaks in pressure and contents of the container once this is full.

What is more, any improper misalignment of the deformation may also give rise to leaks in the pressure and contents of the container. If the misalignment is of the deformation axis in respect of the container axis, there will be some zones with more deformation than there should be, and others with less deformation than there should be, which may also give rise to the problems stated above.

Manual measurement devices have been described and marketed in order to measure the degree of deformation of the join between the dome of an aerosol package and the cup holding the valve.

An example of these devices can be found in CN 103245274 A. This invention describes a measuring device which is provided with an axle close to the measuring zone with two probes which open in opposite directions, and a graduated rule at an opposite end, distant from the axle.

Although this device can be used to take measurements in a sample of a mass-production range, its manual use means that this device cannot be used in an automated system in a production line for filling aerosol containers, which could involve around 200 units/minute. The measurement should also be taken around the whole perimeter of the cylindrical body, for which reason numerous measurements of each container must be taken, at least one for each deformation zone. Apart from this, although the distance between the deformed zones may be known, it is nevertheless true that the deformation may not be regular, meaning that this may give correct measurements in an improperly sealed container. Equivalent devices may be found in CN 203241000 U, in DE 1773214 U, or in DE 8318423 U.

JP 2001 241904 A describes a measuring device, particularly for cans, such as drinks cans, fitted with a centring mechanism, which comprises a lower conically-shaped recessed surface and a device for measuring the depth of the outer concavity of said can. The valves of aerosol cans have a small tube located in the centre of the valve holder cup, which remains in the centre of the dome after being installed. It is thus not possible to support the device of JP 2001 241904 A in the dome of the aerosol container, and thus to take a measurement as described in said document. The aforementioned document furthermore takes a vertical measurement, in the direction of the displacement axis, and not of the cavities (non-existent in drinks cans) of the valve holder cup of the aerosol can.

GB 1 202 621 A describes a device for measuring the diameter and depth of the closure cap of an aerosol container that includes sensing means such as arms for measuring the diameter and a piston with positioning members and for measuring the depth, both means being coupled to a single clock gauge containing scales for both diameter and depth.

US 2008/066332 A1 describes a method of detecting a potentially void inhaler can valve, which valve is attached to a can by a ferrule crimp, comprising the steps: placing the can in a can jig that is arranged to retain the can at a predetermined measurement height with respect to a diameter measuring means, measuring the diameter of the ferrule crimp at the predetermined height, and comparing the measured crimp diameter with a predefined interval of acceptance, and if the measured diameter is outside a predefined interval classifying the inhaler can valve as potentially void. There is also provided a crimp diameter measuring device comprising: a base, a diameter measuring means supported by the base, and a can jig supported by the base, the can jig being arranged to retain a can placed therein at a predetermined measurement height with respect to a diameter measuring means.

It is thus one object of this invention to provide a method for continuous measurement of the sizes of the expansion points at the join of the valve holder cup with the cavity of the dome of aerosol containers on a packaging and filling line of said containers, as described in independent claim 1, in such a way that said device means that the quality control of the line is improved, the sealing of all the containers is guaranteed, wear is detected to allow the proper replacement of the joining elements in the packaging process, the number of rejected units is minimised and thus also their transport, also improving the safety of the containers for users, minimising the loss of the substances or materials contained in the container and of propellant gas, and also reducing the economic claims and claims for damages caused by the aforementioned problems; and, in short, providing a significant advantage in production processes, quickly paid off with the installation of the device according to the invention.

This invention also extends to a device for implementing said method, as described in the claims.

SUMMARY OF THE INVENTION

The invention being proposed consists of a method for inspecting and measuring openings in aerosol containers, and particularly for inspecting and measuring the join between the hole in the dome of an aerosol container and the corresponding valve holder cup. This method is carried out continuously on the production line; in the event of the speed of this process being under that of other processes, each production line could be divided into two or more inspection lines. The method comprises the stages of:

Axial alignment of a measuring head over the dome of an aerosol container, in its transit along the inspection line; this inspection line may be continuously linear, fixed linear or by means of a rotary device, such as an inspection drum for example; when the container reaches the measuring zone, the head must move at the same speed as the container, or the container and the head must be immobile when the measurement is taken;

Drawing up the head to the container (or the container to the head) until contact is made with the upper edge of the join between the hole in the dome and the valve holder cup; since there may be small differences in height between the two containers, or there may even be a difference in height in the support on which the container rests during measurement, the height of the measurement being determined in respect of the aforementioned upper edge, since the deformation zone is fixed and predetermined; between two series of different containers they may however also be small differences in the distance of the plastic deformation to the upper edge; for this reason the machine will be calibrated and adjusted according to the specific conditions of the packaging series; it is thus necessary for the measurement reference to be taken in respect of a fixed reference, in this case the upper edge;

Centring the measuring head and the aerosol container, to get an accurate measurement;

Having a measuring device approach from a rest position to a predetermined height, coinciding with the plastic deformation zone forming the joint; as was stated in the previous point, the plastic deformation zone is predetermined for each packaging series, but it may vary from one series to another, or even from one line to another; for this reason the descent may be predetermined in the programming for the line, or there may be a sensor medium which determines the height at which said plastic deformation occurs in each container; in general the measuring device will descend along with the head to which this is integrally joined, that is, with no relative movement between the measuring device and the head;

Carrying out the measuring operation in respect of said centred position, so that:

The measurement is taken at different points of the circumference at the predetermined height or as identified by a sensor, preferably simultaneously;

The measurement is taken by means selected from the following:
Mechanical,
Optical (laser),
Magnetic,
Electric or electronic,
Sonic The measurement is preferably taken by mechanical systems by means of one or more probe arms, in which there is expansion in the measuring stage and retraction in the descending and ascending stages; in general the reading of the measurement will be taken through the linear or angular displacement of the probe arms, by mechanical, optical (laser), electric, electronic or sonic means; the action of the probe devices may, without implying any limitation thereby, be electrical, magnetic, pneumatic, hydraulic and the return to the rest position may take place through the action of fixed elastic elements (springs) or induced items (servos, pneumatic, magnetic, hydraulic or mechanical means, etc.);

If the measuring is at discrete points (not a continuous measurement) this includes the stage of relative rotation between the measuring device and the aerosol container, so that the measuring devices verify a part of the sealing perimeter preferably close to 100% of its total length; since the join is fixed by a set of expanding arms, producing the plastic deformation on expanding in only certain zones of the perimeter, other non-deformed zones being secured by the adjacent deformations; the degree of rotation will depend on the number of sensor elements;

Retraction of the measuring device again as far as the rest position, and of the head also as far as its rest position;

Transfer of data, good or bad part, to a control unit, and possibly the measurements of each of the measuring elements for each of the zones; said data will normally determine the acceptance or rejection of the containers on the production line.

The method also comprises a regular calibration of the measuring head by means of reference probes, which can be performed on the packaging line itself or off this.

The invention also consists of a measuring device which enables the method described to be implemented.

Said measuring device is installed on an aerosol container manufacturing and packaging line and may consist of a single branch, if the production speed is not slowed up thereby, or of a set of branches, if this is needed to take the measurement correctly.

The measuring device is located in a fixed manner on the line, when the measuring is done with the aerosol container in a fixed position, or mobile, when the measurement is taken with the aerosol container in movement.

The measuring device comprises the following elements:

A head support; said head support comprises axial travel means, to move said head from a rest position, in which it does not perform any action, to a position where it is supported on and centres over the container dome;

A head held on said support, able to move axially, to approach or withdraw from the container, as stated;

A centring element placed in the head; according to a preferential embodiment the portion of said centring element closest to the container is in a truncated cone shape (on the interior and/or exterior), in such a way that this produces a relative self-centring between container and head when resting on the dome or on its join with the cup; the interior part of the end of the head is hollow, so that the valve of the aerosol container does not have any support or retaining in the measuring process; the centring element is axially mobile in respect of the head;

A measuring element, normally joined to the head, and able to move axially with this; the support of the centring element on the container will determine a stop for its travel which will determine the reading position; said measuring element comprises mechanical, optical, sonic or electronic elements which take the measurement; in one specific form the measuring element is mechanical, comprising according to one option:

A set of fastenings for probes set on a moving element of the head; these fastenings are pivoting fastenings with no gaps;

A set of measuring arms, each of the measuring arms being made up of:
  A pivot axis;
  A lower portion;
  A measuring probe placed at the end of the lower portion;
  An upper portion;
  An actuating means to move the measuring arm from its rest position, in which it does not perform any reading, to a measuring position, in which the maximum degree of opening determines the measurement taken in respect of the centreline; said actuating means may be, for example:
    Electrical
    Mechanical
    Hydraulic
    Pneumatic
    Or a combination of two or more of the previous ones;
  A means of returning to the rest position; said means may be an elastic means, such as a spring, or controlled, for example by:
    Electrical
    Mechanical
    Hydraulic
    Pneumatic means
    Or a combination of two or more of the above;
  A reader for the movement of the upper arm; said reader may for example be:
    Mechanical
    Optical
    Magnetic
    Sonic
    Or a combination of two or more of these;
  And may or may not be provided with the corresponding signal transducer, as well as with the means for transmitting the information required to the system to determine whether the container is a good part or needs to be rejected;

A means of rotating the head, of the support of the head or of the measuring element placed in the head; insofar as the seams that have to be measured are not continuous, and the probes do not cover the entire perimeter to be measured, said rotation enables the measurement to be verified along the whole perimeter of the deformation of the join.

According to the invention, after inserting and fixing the valve holder cup in the cavity of the aerosol container dome, this container (normally filled with the product contained, but still without the propellant gas) is made to circulate through one or more control lines, which may be linear or circular and the movement speed of the container is made to coincide with that of the measuring head. Said operation can be performed in static mode, each container stopping during the measuring process in the position in which the head is located (which normally requires dividing a production line into different control lines which will normally then go back into a single line for filling the propellant gas) or this can also be carried out dynamically, in such a way that each head moves simultaneously with the container; this can thus be performed in a control drum, in which the containers are inserted from a single external position, so that the drum rotates along with the measuring heads, or in a straight line, in this case with the measuring heads having to move along with the containers and again go back to the initial position.

With the stoppage or relative movement between the head and the container adjusted, the head moves axially until the centring element of this head contacts and fits over the dome or upper perimeter of the cup opening, which due to the truncated cone shape of the end causes a relative axial centring. After getting into this centred position, the reading element continues to approach (normally along with the head, the centring device being retained in its centring position) as far as the reading position. This reading position will be determined by the position of the centring element or by other means (by means of position or movement sensors, for example) and will coincide with the position in which the fixing deformations should be located. In this position, the reading device is activated to take the required measurement, rotating the head or said reading device to the extent required. According to one embodiment option, the measurement is taken, for example, by the use of probes held on pivoting arms or by means of linear displacement, said arms comprising the corresponding elements for reading the measurement, thus determining the measurements taken by each of the probes. By rotating the head or the elements carried by this, a measurement is taken of the seams formed by the plastic deformation along a certain angular travel, which should reach close to 100% of the corresponding height. This is a way to find out the maximum and minimum dimensions of said deformation along the perimeter of the join, determining whether the container, before being filled with propellant gas, can go on along the line or has to be withdrawn, this then lying outside the scope of the invention.

After the above operation has been performed, the arms carrying the probes are withdrawn and the head is taken out axially, withdrawing the support on the aerosol container, thus being ready to take a further measurement.

BRIEF DESCRIPTION OF THE DRAWINGS

In order to illustrate the following explanation we are providing four sheets of drawings along with this report, in which nine figures represent the essence of this invention, merely as an example without any limitation being implied thereby, and in which.

Figure 1:
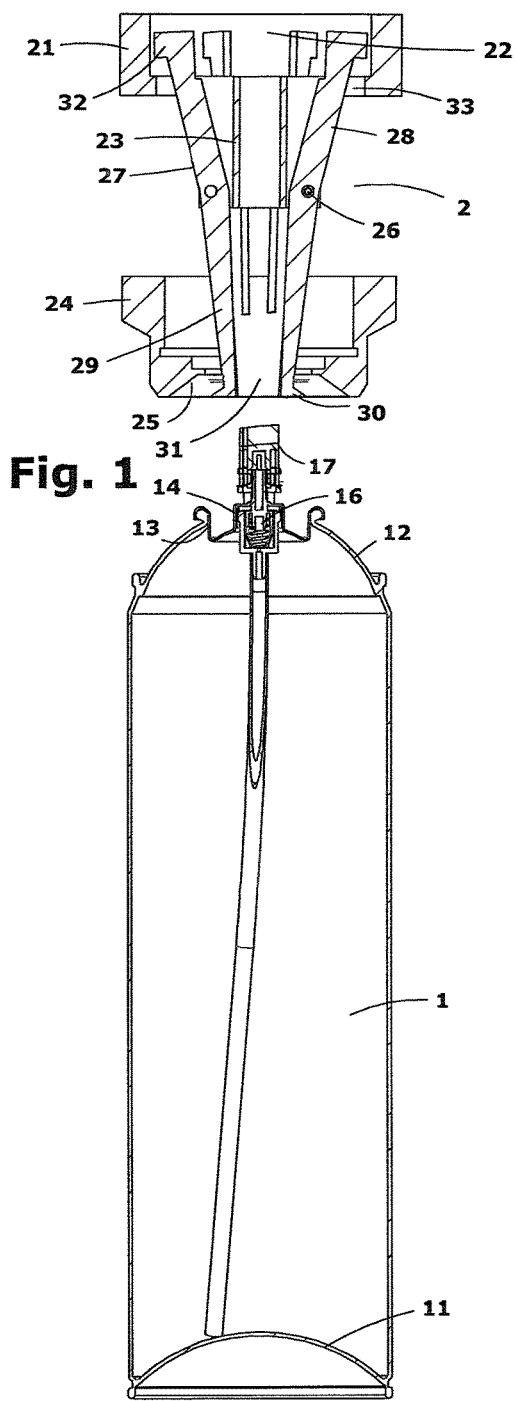
FIG. 1 shows a schematic sectional view of an aerosol container in the stage when the seam formed by the join between the hole and the valve holder cup is measured.
Figure 2:
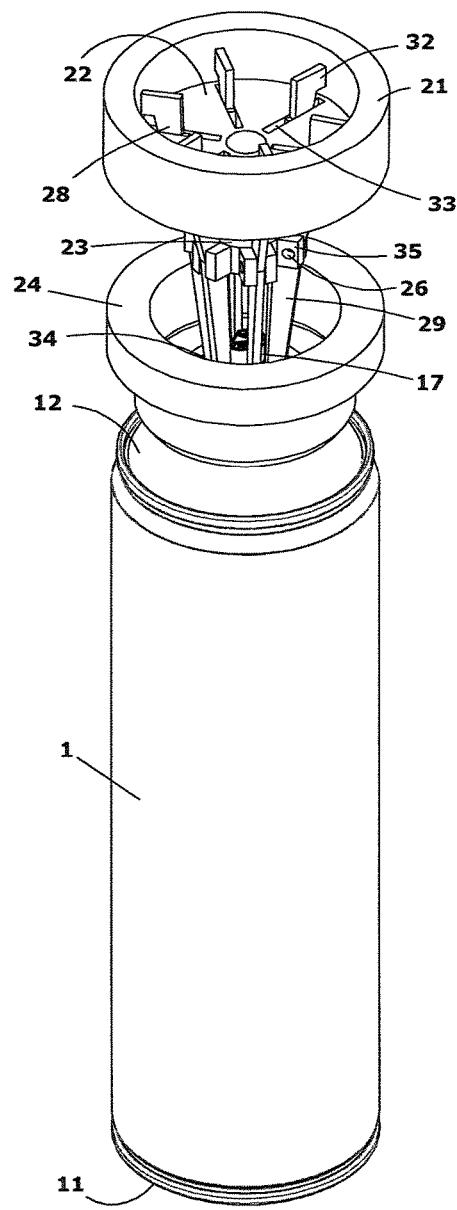
FIG. 2 shows a schematic view in perspective of the item seen in FIG. 1.
Figure 3:
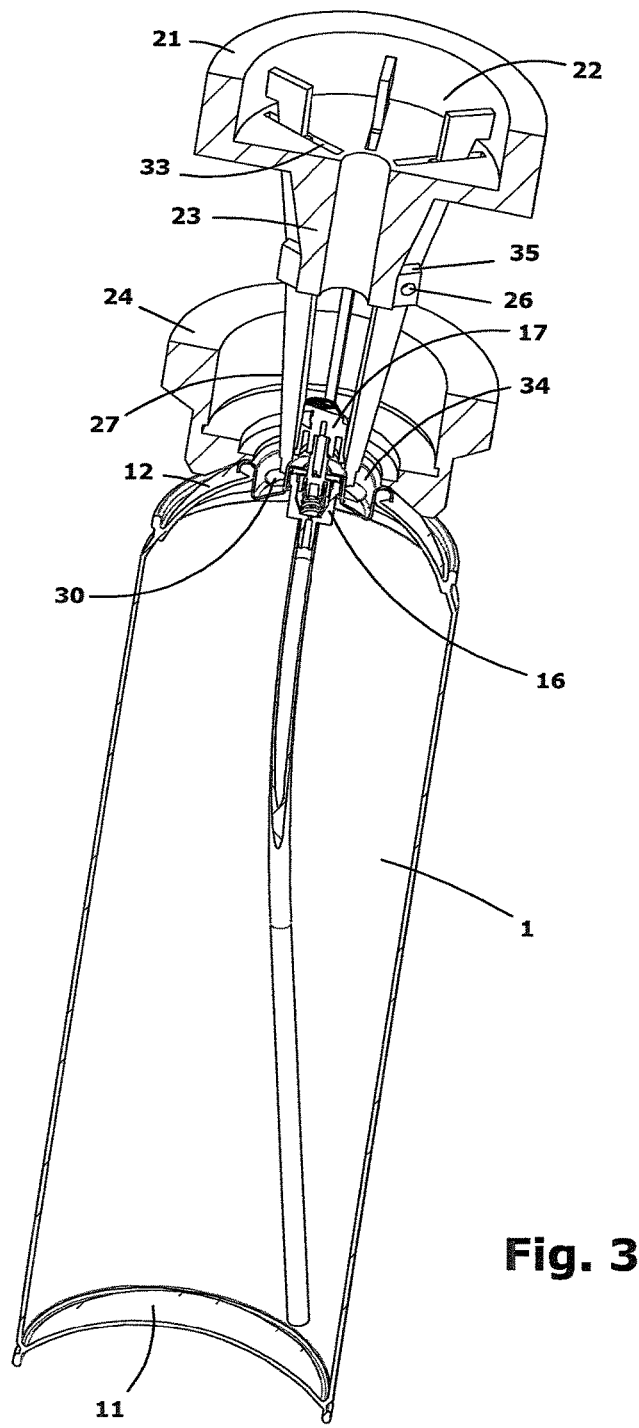
FIG. 3 shows a cross-section of the perspective seen in FIG. 2.
Figure 4:
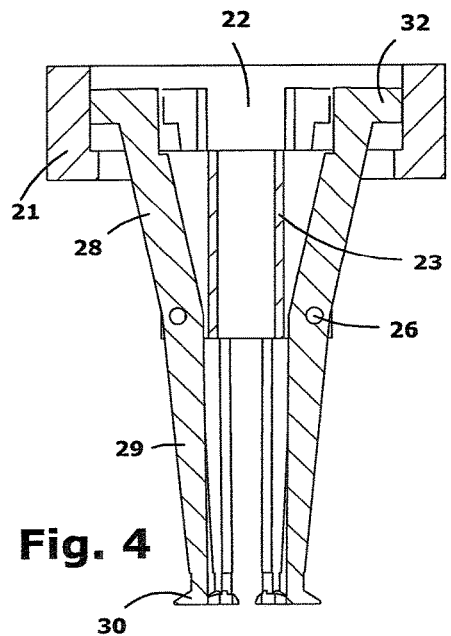
FIG. 4 shows a sectional view of the measuring device in a closed position, at rest.
Figure 5:
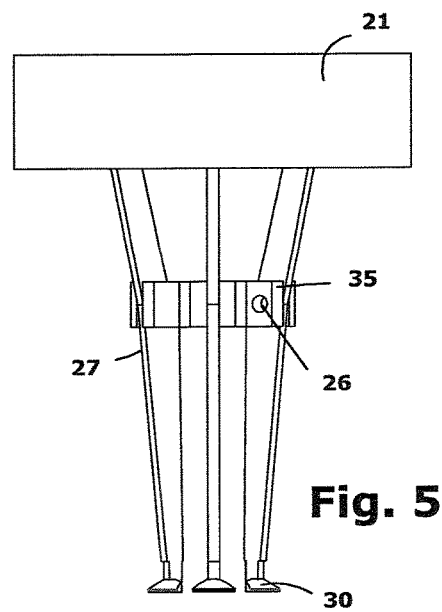
FIG. 5 shows a lateral view of the device seen in FIG. 4.
Figure 6:
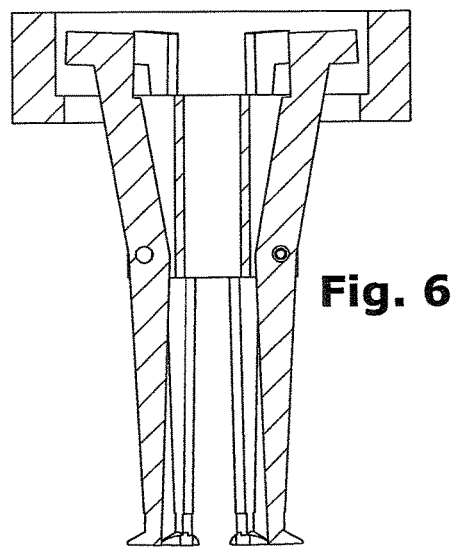
FIG. 6 shows a sectional view of the measuring device in an open position, in the measuring process.
Figure 7:
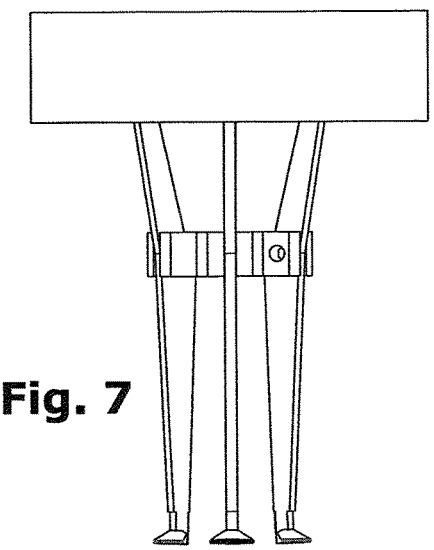
FIG. 7 shows a lateral view of the device seen in FIG. 6.
Figure 8:
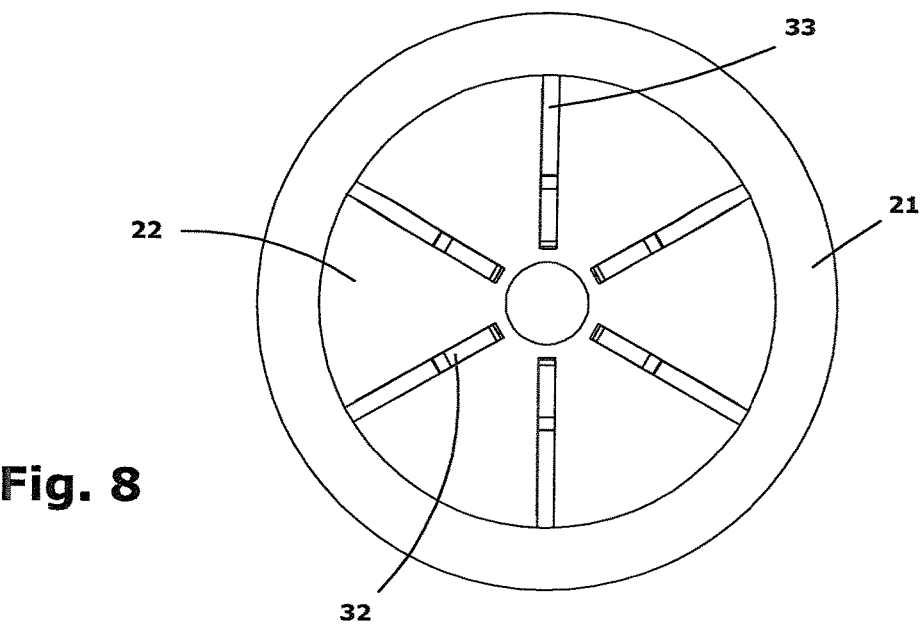
FIG. 8 shows an upper view of the device seen in FIGS. 4 to 7.
Figure 9:
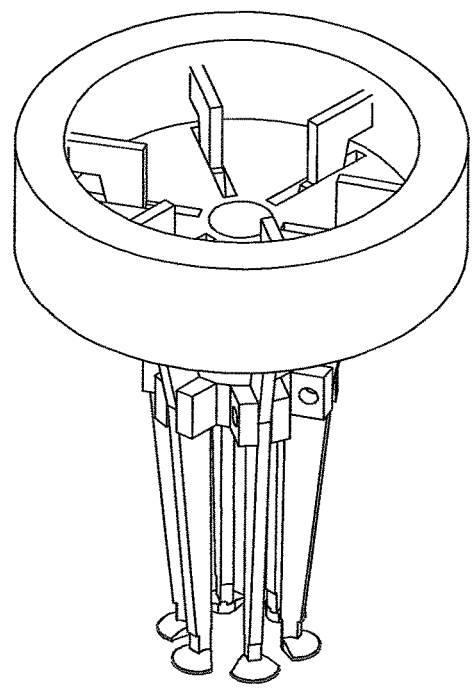
FIG. 9 shows a perspective view of the device seen in FIGS. 4 to 8.

The following reference numbers are used in said figures:
  1 aerosol container
  2 measuring head
  11 bottom of the aerosol container 12 dome of the aerosol container
13 central hole or cavity in the dome of the aerosol container
14 valve holder cup
16 valve
17 trigger diffuser
21 support of the measuring device
22 housing of the means for reading the measurement
23 support of the measuring arms
24 centring device
25 conical centring shape in the centring device
26 spindles of the mechanical measuring devices
27 measuring arms
28 upper part of the measuring arms
29 lower part of the measuring arms
30 probes
31 cavity for allowing the valve through
32 upper end of the measuring arms
33 slots for allowing through the top part of the measuring arms
34 interior cavity of the centring device
35 axle-supporting elements

DESCRIPTION OF THE PREFERENTIAL FORMS OF EMBODIMENT

The preferential forms of embodiment of the measuring device for openings of aerosol containers are now described, according to the enclosed figures, and since the method has already been described this will be taken as reproduced herein.

An aerosol container (1) is thus formed of a canister or body, normally made of metal plate, which is provided with a bottom (11) and a dome (12). The dome (12) has a central cavity or hole (13) in which a valve holder cup (14) is inserted and fixed to the hole (13) by means of plastic deformation, which will normally be made up of a plurality of seams or deformation segments located along the perimeter of the join, or a continuous seam. The valve holder cup (14) comprises a valve (16) on which a trigger diffuser (17) is located.

A device is proposed for measuring the depth and regularity of said seam or seams for securing the join between the cavity of the dome (12) and the valve holder cup (14).

According to the preferential embodiment described, the measuring device consists of a measuring head with axial travel in respect of the container (1). According to a particular embodiment this comprises a measuring gauge support (21) and a centring element (24). In accordance with one form of embodiment, the centring element (24) consists of an essentially annular piece with an interior cavity (34) for allowing through the valve or the tube or trigger emerging from this. Between the centring element (24) and the measuring gauge support (21) there are means for relative axial travel between a free position of the centring device in which the centring device does not perform any function and a centring position, in which it rests on the aerosol container (1). This means that, after the centring device has rested on the container (1) the axial travel of the head continues, in this case in respect of both the container and of the centring element (24) which holds this, when this movement (that of the head) makes said centring element (24) rest on the dome (12) of the aerosol container or on the join of the dome (12) with the corresponding valve holder cup (14), and this can be provided with elastic means opposing the travel of said centring element (24) in respect of said head. Said elastic means, such as a spring, will make this return to the free position in respect of the measuring gauge support (21) after the centring and measuring operation has been completed.

According to alternative embodiments within the scope of the invention but less desirable, the centring device may be formed of a set of centring arms, acting in an equivalent manner. The embodiment in the form of different arms does not however seem to provide any significant advantages, since although it could reduce the amount of material used, the wear, possible deformations, tensions, adjustment or assembly difficulties, etc. would be greater. Non-mechanical means, for example optical means, could also be used for correcting the relative axial position.

At its free end the centring element (24) has a support in a conical shape (25), a truncated cone shape to be more precise. This truncated cone section can be formed in the interior, when the centring has to be done over the dome (12), and/or on the exterior, if the centring is performed on the upper edge for joining between the cavity (13) of the dome (12) and the valve holder cup (14).

When the head descends it rests the centring element (24) over the container, as was already seen and adjusts the centring position. The measuring elements then travel axially up to the height required to take the measurement. The head is provided with means for controlling the axial travel up to the predetermined position in which the measurement has to be taken. These control means may be connected to a main control unit for the line, or be limited by stops or sensors. To determine the height, the system comprises a control unit in which the parameter is predetermined (or programmed for each series), or a reading device at the height of the fixing where the seam is located. The measuring elements comprise means of axial travel, integral with or linked to the head.

In accordance with a preferred embodiment, the measurement is mechanical, including the following elements:

A measuring gauge support (21), integral with the measuring head; this support (21) comprises means for axial travel after centring in respect of the aerosol container (1) and in which the measurement is taken from the cavity around the valve holder cup (14); the axial travel will normally be of the whole head, but can also be of the measuring means in respect of said head, until the measuring position is reached;

A support (23) for the measuring elements, particularly measuring arms (27); this support is integrally joined to the support (21), preferably being able to form a single piece with this; it forms an extended body which holds measuring arms;

A set of axle-bearing elements (35) placed radially in the support (23);

A set of measuring arms (27) placed radially in the support (23); and pivoting in the axle-bearing elements (35) by means of two spindles (26); the measuring arms can nevertheless be straight and have linear travel;

At least one probe (30) at the bottom end of each measuring arm (27), whose travel determines the measurement that has to be obtained;

A means for driving each measuring arm (27);

A means for reading the maximum movement of each arm (27) in each reading position, which constitutes the measurement obtained.

In the option for pivoting measuring arms, said arms are preferably made up of an upper portion (28), and a lower portion (29) in respect of the spindle (26), in which the probe (30) is placed at the lower end of the lower portion (29), or in an alternative embodiment the measuring arms will be placed linearly also with linear travel in the corresponding housing.

The support (21) comprises a housing (22), normally placed in an upper position, for the means for reading the measurement.

In accordance with one of the embodiments described by means of measuring arms, the support (21) comprises a set of slots (33) through which the top ends (28) of the measuring arms go, in particular the upper ends (32) in which the means for reading the measurement are located.

The lower portion of the set of arms (27) in a retracted position, i.e., in a position close to the centre for insertion into the reading cavity with no obstacles, defines a cavity (31) in which the valve holder cup and the small tube of the valve (16) and/or trigger (17) are located with no restrictions, corresponding to the measuring position in the stage when the head is coupled.

When the head has dropped to the reading position the arms are driven by electrical, mechanical, pneumatic, magnetic or other means until these are expanded, taking the dimensions of said expansion, and then being read by the reading means located in the housing (22) of the support (21), normally associated with the upper end (32) of the arms (27), at the top part of the slots (33).

Since the reading is discrete in this case, the head or the elements carried by this are fitted with rotation media, so that the reading is repeated at different points, or performed continuously along the rotation travel. Depending on the parameters programmed, it will be determined whether the join between the valve holder cup (14) and the hole (13) of the dome (12) is safe and thus whether the container has to go through the filling process or be withdrawn from the line.

Any indication of a higher or lower position etc. must be understood to mean with the container standing upright, with the valve at the top and the head placed above the container. Any inversion of positions or the horizontal positioning of the elements does not alter the essence of the invention, the vertical positions having to be understood as relative horizontal positions in that case.

What is claimed is:

1. A device for inspecting and measuring the mouthpieces of aerosol containers by inspecting and measuring a join between a hole in a dome of an aerosol container and a corresponding valve holder cup as to dimensions of a continuous or discontinuous seam produced by plastic deformation of said join, carried out continuously along a packaging line for aerosol containers said device comprising a measuring head having axial relative displacement capability with respect to an aerosol container which has to be measured, said measuring head comprising:
    a centering element which is located in a lower part of the measuring head, and said centering element having a central interior cavity; and
    a measuring gauge support located above the centering element;
    a device for measuring the mouthpieces to provide a measurement, provided with an arrangement for axial travel in respect of the aerosol container axis;
    wherein the centering element is connected with the measuring gauge support by an elastic centering element having relative axial displacement capability with respect to each other in such a way that when said centering element rests on the aerosol dome in axial displacement thereof, the centering element stops displacement thereof and the measuring head continues lowering movement thereof, against the action of the elastic arrangement of said centering element, up to a predetermined position at which the measurement has to be taken;
    a device for controlling the measuring gauge support axial travel from the position where the centering element rests on the aerosol dome to the position in which the measurement has to be taken;
    wherein the measuring gauge support is provided with a support for a set of measuring arms, wherein said measuring gauge support is provided with a set of axle-bearing elements arranged radially, which house spindles of each of the measuring arms for measuring a distance from a central axis of the container to a periphery of the hole in the dome simultaneously at different points; and
    wherein the device rotates relative to the container to obtain the measurement along a complete circle surrounding the container.

2. A device for measuring the mouthpieces of aerosol containers, according to claim 1, wherein the centering element comprises at least one of the following:
    at least one support with an interior conical shape over the dome of the aerosol container and
    an exterior conical shape over the edge of the join of the valve holder cup.

3. A device for measuring the mouthpieces of aerosol containers, according to claim 1, wherein the measuring gauge support comprises a housing for a device for reading the measurement.

4. A device for measuring the mouthpieces of aerosol containers, according to claim 1, wherein each of the measuring arms is made up of a lower portion having an end fitted with a probe, and an upper portion having an upper end including a device for reading the measurement.

5. A device for measuring the mouthpieces of aerosol containers, according to claim 4, wherein the support element is provided with a set of slots through which the upper portion of the measuring arms extend.

6. A device for measuring the mouthpieces of aerosol containers, according to claim 1, wherein the measuring gauge support is provided with a support for a set of measuring arms, wherein said support is in turn provided with a linear housing for longitudinal movement of the measuring arms.

7. A device for measuring the mouthpieces of aerosol containers, according to claim 1, wherein, in a rest position there is a cavity between the measuring arms and further comprising one of a valve and a trigger in the cavity in a phase for coupling the measuring head to a measuring position.

8. A device for measuring the mouthpieces of aerosol containers, according to claim 1, wherein at least one of the measuring head and the support for the measuring arms are provided with a rotation arrangement for rotating the device.

* * * * *